United States Patent
Egami

(10) Patent No.: US 10,642,558 B2
(45) Date of Patent: May 5, 2020

(54) IMAGE FORMING APPARATUS WHICH SAVES LOG ERROR LOGS

(71) Applicant: KYOCERA Document Solutions Inc., Osaka (JP)

(72) Inventor: Ryo Egami, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/269,286

(22) Filed: Feb. 6, 2019

(65) Prior Publication Data

US 2019/0258439 A1 Aug. 22, 2019

(30) Foreign Application Priority Data

Feb. 20, 2018 (JP) .................................. 2018-028118

(51) Int. Cl.
*G06F 3/12* (2006.01)
*H04N 1/00* (2006.01)
*G06F 11/07* (2006.01)
*H04N 1/32* (2006.01)
*G06F 11/14* (2006.01)

(52) U.S. Cl.
CPC .......... *G06F 3/1273* (2013.01); *G06F 3/1259* (2013.01); *G06F 11/0733* (2013.01); *G06F 11/0772* (2013.01); *G06F 11/0778* (2013.01); *H04N 1/00411* (2013.01); *H04N 1/32694* (2013.01); *G06F 3/121* (2013.01); *G06F 3/1234* (2013.01); *G06F 11/1448* (2013.01)

(58) Field of Classification Search
None
See application file for complete search history.

(56) References Cited

U.S. PATENT DOCUMENTS

| 6,243,627 B1* | 6/2001 | Ozeki | F02D 41/2487 123/479 |
| 9,015,506 B2* | 4/2015 | Park | G06F 1/3293 713/320 |
| 9,053,060 B2* | 6/2015 | Komada | G06F 11/1435 |
| 2010/0211743 A1* | 8/2010 | Hara | G06F 12/0866 711/119 |
| 2015/0046663 A1* | 2/2015 | Ikeda | G06K 15/40 711/154 |
| 2015/0332134 A1* | 11/2015 | Arai | B41J 29/38 358/1.15 |
| 2017/0131698 A1* | 5/2017 | Hatakeyama | B60L 3/0092 |
| 2019/0121561 A1* | 4/2019 | Okamura | G06F 3/0635 |

FOREIGN PATENT DOCUMENTS

JP 2005-96240 A 4/2005

* cited by examiner

*Primary Examiner* — Miya J Williams
(74) *Attorney, Agent, or Firm* — Stein IP, LLC

(57) ABSTRACT

The image forming apparatus includes a first control section and a second control section. The first control section includes first nonvolatile memory having a log saving area and, upon occurrence of an error, acquires an error log and saves the error log into the log saving area. The second control section includes second nonvolatile memory for storing second software therein and, upon occurrence of an internal communication error causing an interruption of communications with the first control section, the second control section erases the second software and saves in the second nonvolatile memory a communication error log necessary for analysis of the internal communication error.

3 Claims, 4 Drawing Sheets

IMAGE FORMING APPARATUS WHICH SAVES LOG ERROR LOGS

INCORPORATION BY REFERENCE

This application is based upon and claims the benefit of priority from the corresponding Japanese Patent Application No. 2018-028118 filed on Feb. 20, 2018, the entire contents of which are incorporated herein by reference.

BACKGROUND

The present disclosure relates to an image forming apparatus.

An image forming apparatus is equipped with a first control section (system controller) and a second control section (engine controller). The first control section performs overall control for the image forming apparatus. The second control section performs control over printing operations of the image forming apparatus.

SUMMARY

An image forming apparatus according to the present disclosure includes a first control section and a second control section. The first control section includes first nonvolatile memory which is for storing first software therein and which has a log saving area for saving an error log necessary for analysis of an occurrent error, where the first control section performs processes based on the first software and, upon occurrence of the error, acquires the error log and saves the error log into the log saving area. The second control section includes second nonvolatile memory for storing second software therein, where the second control section performs processes based on the second software and, upon occurrence of, as the error, an internal communication error causing an interruption of communications with the first control section, erases the second software from the second nonvolatile memory and saves into the second nonvolatile memory, as the error log, a communication error log necessary for analysis of the internal communication error.

DETAILED DESCRIPTION

<Configuration of Image Forming Apparatus>

Figure 1:
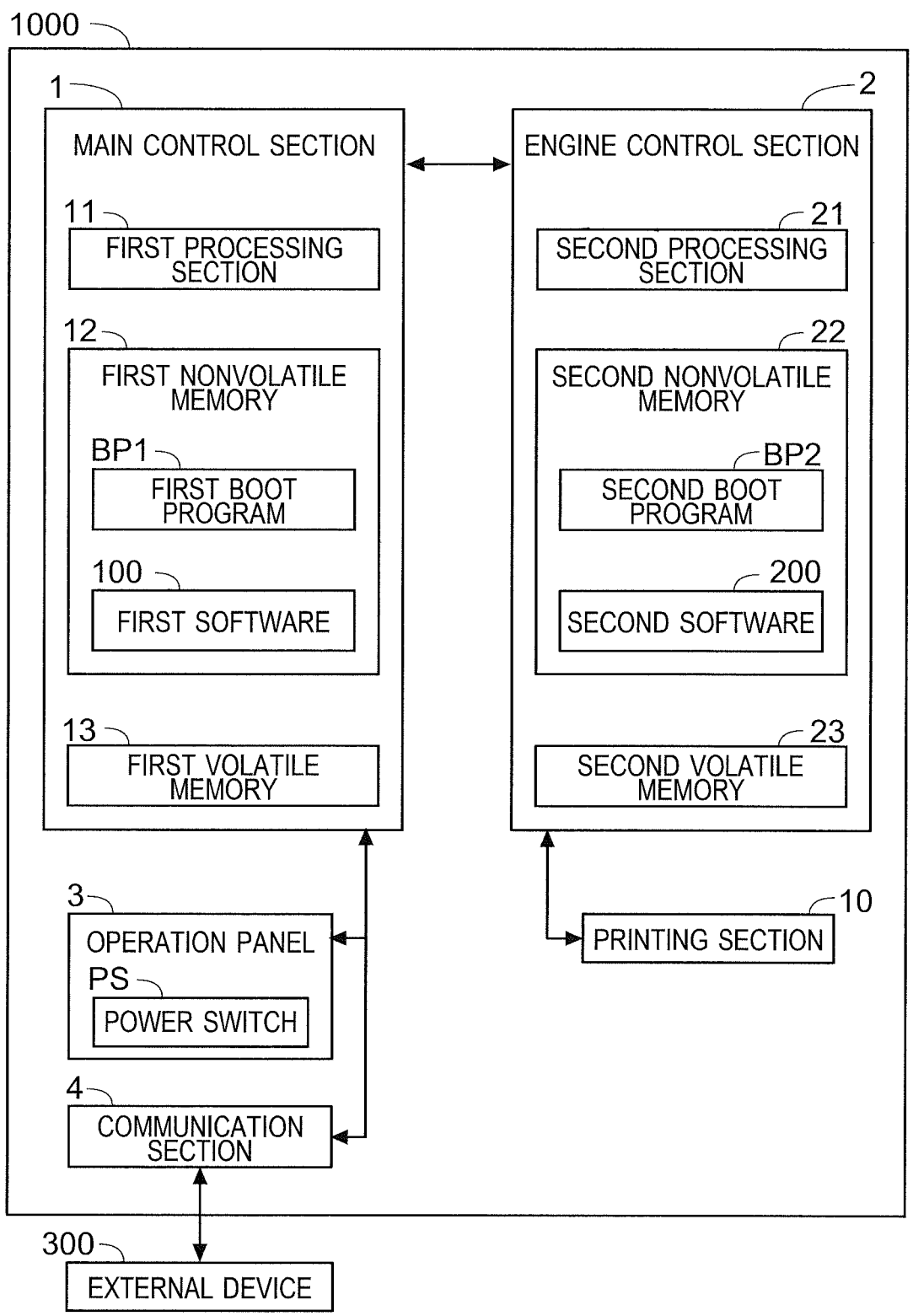
FIG. 1 is a block diagram showing an overall configuration of an image forming apparatus according to one embodiment of the present disclosure.

As shown in FIG. 1, an image forming apparatus 1000 of this embodiment includes a printing section 10. The printing section 10 executes print jobs. In execution of a print job, the printing section 10 conveys a sheet of paper, forms an image to be printed, and prints the image on the sheet under conveyance.

The image forming apparatus 1000 is also equipped with a main control section 1. The main control section 1 corresponds to a 'first control section.' The main control section 1 includes a first processing section 11, first nonvolatile memory 12, and first volatile memory 13. The first processing section 11 is a CPU, the first nonvolatile memory 12 is ROM, and the first volatile memory 13 is RAM.

The first processing section 11 operates based on first software 100 to perform processes for controlling the overall image forming apparatus 1000. The first software 100 is stored in the first nonvolatile memory 12 and developed onto the first volatile memory 13. A first boot program BP1 for booting the first processing section 11 is stored in the first nonvolatile memory 12.

The main control section 1 is communicatably connected to the engine control section 2 to give instructions to the engine control section 2. The engine control section 2 corresponds to a 'second control section.' The engine control section 2 includes a second processing section 21, second nonvolatile memory 22, and second volatile memory 23. The second processing section 21 is a CPU, the second nonvolatile memory 22 is flash ROM, and the second volatile memory 23 is RAM. It is noted that the second nonvolatile memory 22 is smaller in capacity than the first nonvolatile memory 12.

The second processing section 21 operates based on second software 200. The second processing section 21 receives instructions from the main control section 1 to perform processes for controlling printing operations of the printing section 10. The second software 200 is stored in the second nonvolatile memory 22 and developed onto the second volatile memory 23. A second boot program BP2 for booting the second processing section 21 is stored in the second nonvolatile memory 22.

The image forming apparatus 1000 further includes an operation panel 3. The operation panel 3 includes a touch screen and hardware buttons. The touch screen displays a screen to accept operations made on the display screen. The hardware buttons are provided in plurality on the operation panel 3. An example of the hardware buttons provided on the operation panel 3 is a power switch PS for throwing and interrupting main power of the image forming apparatus 1000. The image forming apparatus 1000 can be started up (or restarted) by operating the power switch PS.

The operation panel 3 is connected to the main control section 1. The main control section 1 controls display operations of the operation panel 3, and detects operations made on the operation panel 3.

The image forming apparatus 1000 is further equipped with a communication section 4. The communication section 4 is a communication interface for communicatably connecting an external device 300 to the image forming apparatus 1000. The communication section 4 includes a communication circuit, communication memory, and a communication connector. The communication section 4 is connected to the main control section 1. The main control section 1 uses the communication section 4 to communicate with the external device 300 connected to the image forming apparatus 1000.

For example, a user terminal (personal computer or the like) to be used by a user of the image forming apparatus 1000 may be connected, as the external device 300, to the image forming apparatus 1000. Connecting a user terminal to the image forming apparatus 1000 enables the image forming apparatus 1000 to execute printing based on print data transmitted from the user terminal to the image forming apparatus 1000 (i.e., enables the image forming apparatus 1000 to function as a printer). In addition, a maintenance terminal (personal computer or the like) to be used by a maintenance servicer who serves for maintenance of the image forming apparatus 1000 may also be connected, as the external device 300, to the image forming apparatus 1000.

<Saving of Error Log>

Upon occurrence of an error in the image forming apparatus 1000, the main control section 1 acquires a log for use in analyzing the error having occurred in the image forming apparatus 1000 (hereinafter, the log will be referred to as error log). In this process, various information, such as information as to the first nonvolatile memory 12 at the time of the error occurrence or information as to the first volatile memory 13 at the time of the error occurrence (hereinafter, the various information will be referred to as first information) is acquired as an error log by the main control section 1. For example, the information as to the first volatile memory 13 at the time of the error occurrence may include a process then under execution on the first volatile memory 13, set values for the process, a duty cycle of the first volatile memory 13, and the like.

Further, upon occurrence of an error in the image forming apparatus 1000, the engine control section 2, like the main control section 1, also acquires, as an error log, various information such as information as to the second nonvolatile memory 22 at the time of the error occurrence or information as to the second volatile memory 23 at the time of the error occurrence (e.g., a process then under execution on the second volatile memory 23, set values for the process, and a duty cycle of the second volatile memory 23), and the like (hereinafter, the various information will be referred to as second information).

The main control section 1 saves the first information acquired as an error log into the first nonvolatile memory 12. For example, a log saving area is preparatorily ensured in the first nonvolatile memory 12. The first information as an error log is saved in the log saving area of the first nonvolatile memory 12.

Also, the main control section 1 communicates with the engine control section 2 to acquire, from the engine control section 2, the second information that the engine control section 2 has acquired as an error log. In other words, the engine control section 2 transmits the second information acquired as an error log to the main control section 1. The main control section 1 saves the second information as an error log acquired from the engine control section 2 into the log saving area of the first nonvolatile memory 12.

For example, connecting the external device 300 to the image forming apparatus 1000 makes it possible to read, onto the external device 300, the error log saved in the log saving area of the first nonvolatile memory 12. It is also possible to display, on the operation panel 3, the error log saved in the log saving area of the first nonvolatile memory 12.

However, upon occurrence of an error causing communication interruption between the main control section 1 and the engine control section 2 (hereinafter, referred to as internal communication error), the second information that the engine control section 2 has acquired as an error log for use in analyzing the internal communication error (hereinafter, referred to as communication error log) is not transmitted from the engine control section 2 to the main control section 1. That is, the second information as a communication error log is not saved in the log saving area of the first nonvolatile memory 12. On condition that the second information as a communication error log is not saved in the log saving area of the first nonvolatile memory 12, the second information as a communication error log cannot be checked, so that an analyzer cannot achieve an efficient error analysis, disadvantageously.

Therefore, upon occurrence of an internal communication error, the engine control section 2 executes a process of saving the second information as a communication error log into the second nonvolatile memory 22 (hereinafter, referred to as communication-error emergency process). In addition, the second information as a communication error log saved in the second nonvolatile memory 22 will be saved later in the log saving area of the first nonvolatile memory 12 (which will be detailed later). As a result, during the analysis work for the internal communication error, the analyzer is enabled to check the second information as a communication error log.

In the second nonvolatile memory 22, there is stored control information indicative of a setting content of a setting as to whether or not a communication error log is to be saved in the second nonvolatile memory 22 (hereinafter, the setting will be referred to as log save setting). The log save setting is executed by a maintenance servicer of the image forming apparatus 1000 or a user of the image forming apparatus 1000. The log save setting is accepted by the operation panel 3. The log save setting may be executed also from the external device 300 connected to the image forming apparatus 1000.

In this connection, a capacity for additional saving of a communication error log is not ensured in the second nonvolatile memory 22. For this reason, in the communication-error emergency process by the engine control section 2, the second software 200 is erased from the second nonvolatile memory 22 so as to ensure a saving area for the communication error log in the second nonvolatile memory 22. However, erasure of the second software 200 from the second nonvolatile memory 22 would cause the image forming apparatus 1000 to no longer operate normally.

Figure 2:
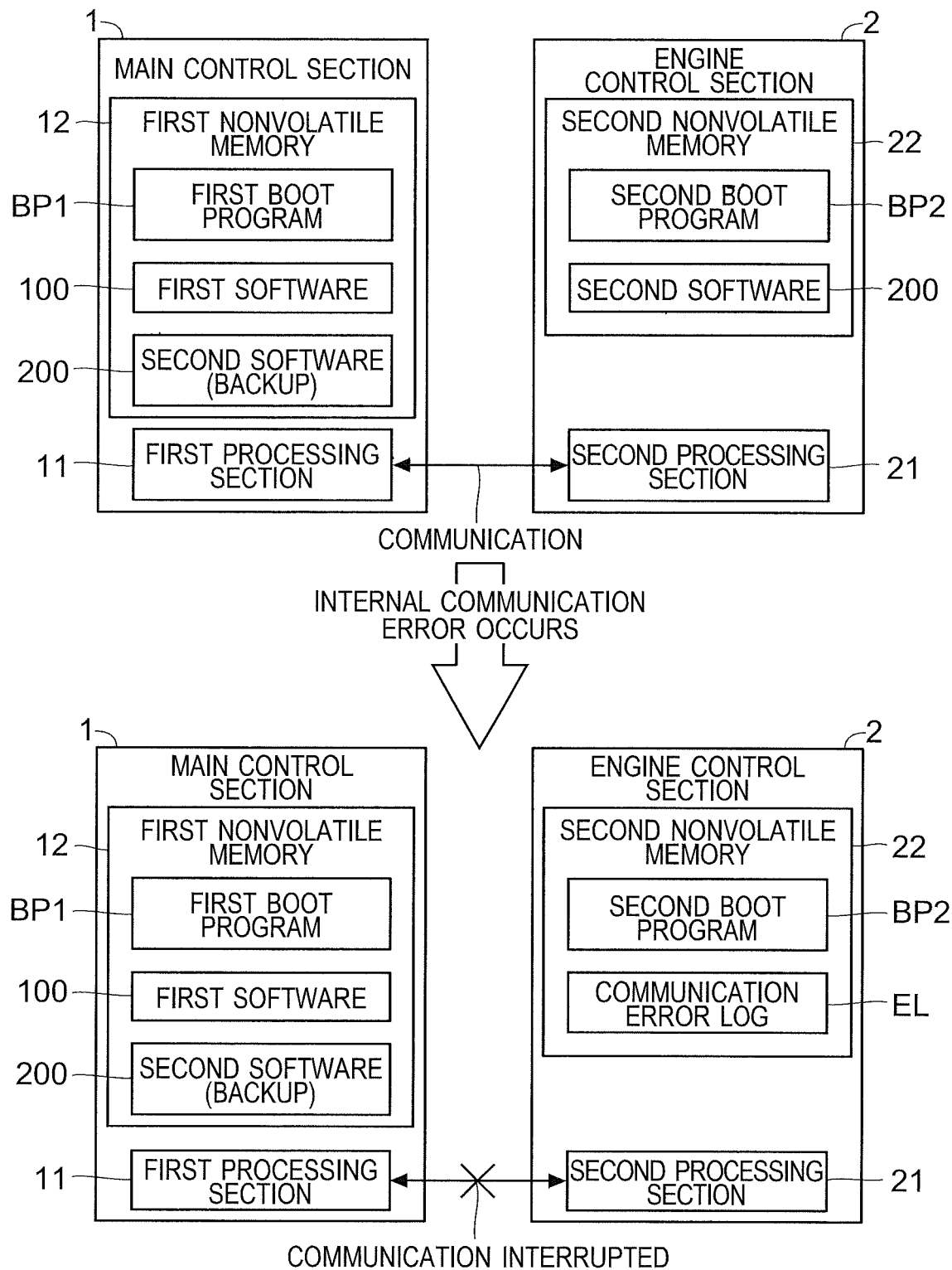
FIG. 2 is a view showing states before and after occurrence of an error in second nonvolatile memory of the image forming apparatus according to one embodiment of the disclosure.

Therefore, as shown in FIG. 2, backup-dedicated second software 200 is preparatorily stored in the first nonvolatile memory 12 that is larger in capacity than the second nonvolatile memory 22. For example, storage of the backup-dedicated second software 200 into the first nonvolatile memory 12 is executed in the course of factory shipping of the image forming apparatus 1000. After that onward, the second software 200 is updated in version. Each time the second software 200 stored in the second nonvolatile memory 22 is updated to the latest version, the backup-dedicated second software 200 stored in the first nonvolatile memory 12 is also updated to the latest version. Updating work for the second software 200 is performed by a maintenance servicer of the image forming apparatus 1000.

Figure 3:
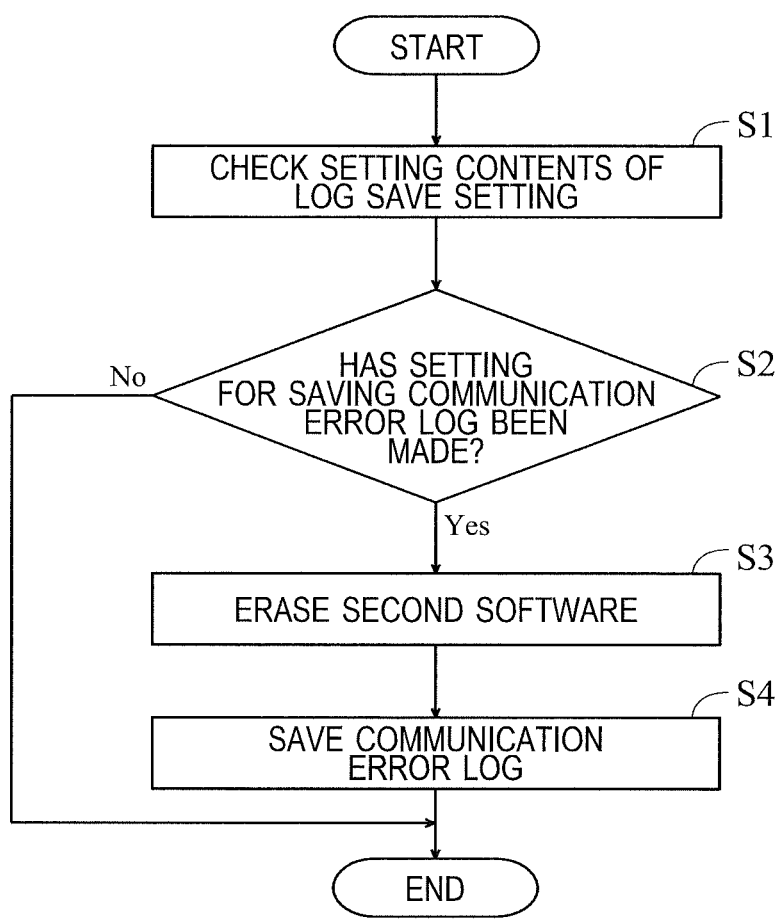
FIG. 3 is a flowchart showing a processing flow which a second control section of the image forming apparatus according to one embodiment of the disclosure executes upon occurrence of an internal communication error.

A flow of the communication-error emergency process (a process of saving second information as a communication error log into the second nonvolatile memory 22) to be executed by the engine control section 2 will be described below with reference to a flowchart shown in FIG. 3. The flowchart of FIG. 3 gets started when the engine control section 2 decides that an internal communication error has occurred.

For example, when there is no response from the main control section 1 to an interrupt signal transmitted to the main control section 1 even after a lapse of a specified time, the engine control section 2 decides that an internal communication error has occurred. In a case where an internal communication error has occurred due to a hangup of the engine control section 2, the communication-error emergency process by the engine control section 2 is not executed. In this case, the second software 200 is not erased from the second nonvolatile memory 22, and the second information as a communication error log is not saved in the second nonvolatile memory 22.

Upon occurrence of an internal communication error in the image forming apparatus 1000, at step S1, the engine control section 2 checks setting contents of the log save setting indicated by control information stored in the second nonvolatile memory 22. Then, at step S2, the engine control section 2 decides whether or not there has been made a setting for saving a communication error log into the second nonvolatile memory 22. As a result, when the engine control section 2 decides that the setting for saving a communication error log into the second nonvolatile memory 22 has been made, the processing flow moves on to step S3. On the other hand, when the engine control section 2 decides that no setting for saving a communication error log into the second nonvolatile memory 22 has been made, the processing flow is ended. With no setting for saving a communication error log into the second nonvolatile memory 22, the engine control section 2 neither erases the second software 200 from the second nonvolatile memory 22 nor saves a communication error log into the second nonvolatile memory 22.

Upon transition to step S3, the engine control section 2 erases the second software 200 from the second nonvolatile memory 22. In other words, the engine control section 2 ensures, within the second nonvolatile memory 22, a saving area for the second information as a communication error log. Then, at step S4, the engine control section 2 acquires the second information and saves the acquired second information as a communication error log into the second nonvolatile memory 22. The second information as a communication error log is saved in a space area obtained by the erasure of the second software 200 from the second nonvolatile memory 22.

As shown in FIG. 2, the second software 200 had been stored in the second nonvolatile memory 22 before occurrence of the internal communication error (see upper view of FIG. 2). In contrast, due to the execution of the communication-error emergency process by the engine control section 2, the second software 200 is replaced with a communication error log after the occurrence of the internal communication error (see lower view of FIG. 2). In the lower view of FIG. 2, the communication error log is indicated by sign EL.

Upon occurrence of an internal communication error, the main control section 1 instructs the operation panel 3 to display an error message. The operation panel 3 displays, as an error message, a message for prompting a restart of the image forming apparatus 1000. As a result, an operation of restarting the image forming apparatus 1000 (operation of turning off and subsequently turning on the power switch SP) is executed by the user.

After execution of the operation of restarting the image forming apparatus 1000, the main control section 1 executes a boot process based on the first boot program BP1, and the engine control section 2 executes a boot process based on the second boot program BP2. As a result, the main control section 1 and the engine control section 2 come to a mutually communicatable state.

The main control section 1 also performs, as one step of the boot process, a step of reading the first software 100 stored in the first nonvolatile memory 12 onto the first volatile memory 13. Similarly, the engine control section 2 performs, as one step of the boot process, a step of reading the second software 200 stored in the second nonvolatile memory 22 onto the second volatile memory 23.

On this occasion, given that the internal communication error has occurred before the restart of the image forming apparatus 1000, the second software 200 has been erased from the second nonvolatile memory 22, so that the second software 200 cannot be read to the second volatile memory 23. It is noted here that the already executed erasure of the second software 200 from the second nonvolatile memory 22 means that a communication error log has instead been saved in the second nonvolatile memory 22.

In this case, the main control section 1 executes a process of acquiring the communication error log saved in the second nonvolatile memory 22. Further, the main control section 1 executes a process of writing the backup-dedicated second software 200 stored in the first nonvolatile memory 12 onto the second nonvolatile memory 22.

Figure 4:
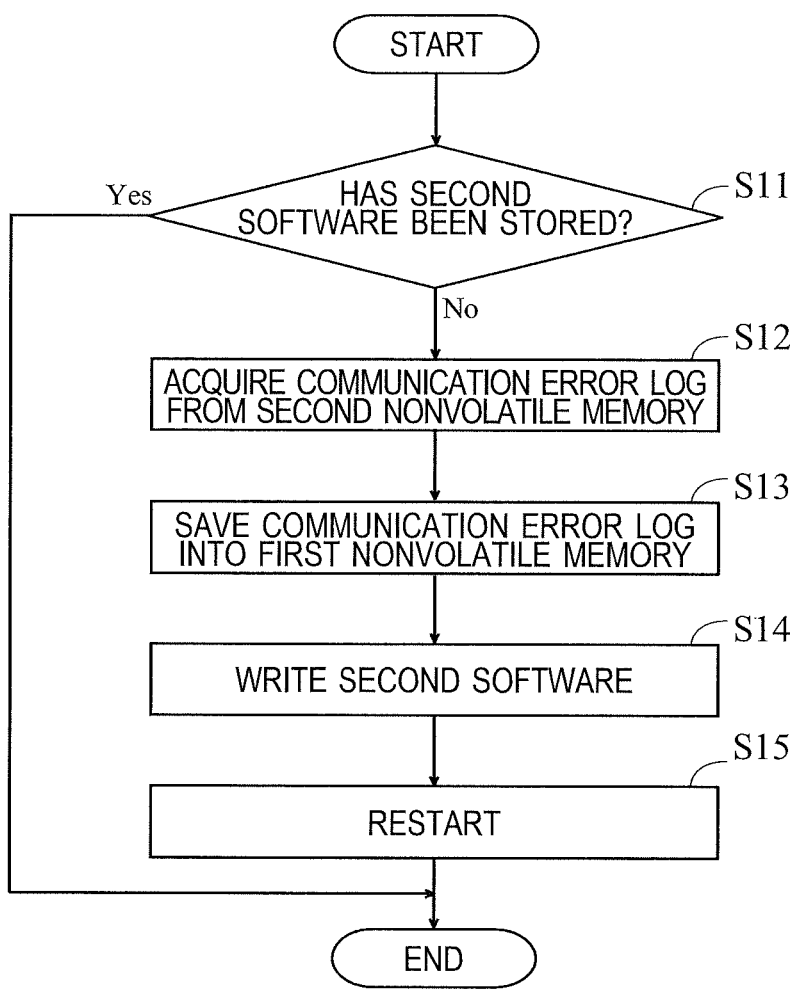
FIG. 4 is a flowchart showing a processing flow which a first control section of the image forming apparatus according to one embodiment of the disclosure executes upon a restart of the image forming apparatus.

A flow of processing to be performed by the main control section 1 upon a restart of the image forming apparatus 1000 will be described below with reference to a flowchart shown in FIG. 4. A start of the flowchart shown in FIG. 4 is a time point when communications between the main control section 1 and the engine control section 2 are enabled after the restart of the image forming apparatus 1000.

At step S11, the main control section 1 communicates with the engine control section 2 to decide whether or not the second software 200 has been stored in the second nonvolatile memory 22. As a result, when the main control section 1 decides that the second software 200 has not been stored in the second nonvolatile memory 22 (the second software 200 has been erased from the second nonvolatile memory 22), the processing flow moves on to step S12; otherwise, when the main control section 1 decides that the second software 200 has been stored in the second nonvolatile memory 22, the processing flow is ended.

Upon transition to step S12, the main control section 1 executes a process of acquiring a communication error log from the second nonvolatile memory 22. Then, at step S13, the main control section 1 saves the communication error log acquired from the second nonvolatile memory 22 into the log saving area of the first nonvolatile memory 12. For example, the main control section 1 transmits an acquisition request for the communication error log to the engine control section 2. Receiving the acquisition request for the communication error log, the engine control section 2 acquires the communication error log from the second nonvolatile memory 22 and transmits the acquired communication error log to the main control section 1. Thus, the communication error log saved in the second nonvolatile memory 22 is acquired by the main control section 1.

After the saving of the communication error log, at step S14, the main control section 1 executes a process of writing the backup-dedicated second software 200 stored in the first nonvolatile memory 12 onto the second nonvolatile memory 22. On this occasion, the main control section 1 transmits the backup-dedicated second software 200 to the engine control section 2. Receiving the second software 200, the engine control section 2 writes the received second software 200 onto the second nonvolatile memory 22.

For example, upon completion of the writing of the second software 200 onto the second nonvolatile memory 22, a completion notification is transmitted from the engine control section 2 to the main control section 1. When the main control section 1 has received the completion notification, the processing flow moves on to step S15.

Upon transition to step S15, the main control section 1 executes the boot process once again (executes a reboot process). The main control section 1 further instructs the engine control section 2 to execute the boot process once again as well. At this time point, the second software 200 has been stored in the second nonvolatile memory 22. Accordingly, by the engine control section 2 executing the boot process once again, the second software 200 is read out from the second nonvolatile memory 22 onto the second volatile memory 23.

Execution of processes along the flowchart shown in FIG. 4 by the main control section 1 causes a reversion from a state shown in the lower view of FIG. 2 (a state subsequent to occurrence of a communication error) to a state shown in the upper view of FIG. 2 (a state prior to occurrence of the communication error). Moreover, although not shown, there results a state in which second information has been saved in the log saving area of the first nonvolatile memory 12 in addition to the first information as a communication error log.

As described hereinabove, the image forming apparatus 1000 of this embodiment includes: a main control section 1 (first control section) including first nonvolatile memory 12 which is for storing first software 100 therein and which has a log saving area for saving an error log necessary for analysis of an error occurring in the image forming apparatus 1000, where the main control section 1 performs processes based on the first software 100 and, upon occurrence of the error, acquires the error log and saves the error log into the log saving area of the first nonvolatile memory 12; and an engine control section 2 (second control section) including second nonvolatile memory 22 for storing second software 200 therein, where the engine control section 2 performs processes based on the second software 200 and, upon occurrence of an internal communication error, which is an error causing an interruption of communications with the main control section 1, erases the second software 200 from the second nonvolatile memory 22 and saves into the second nonvolatile memory 22 a communication error log, which is an error log necessary for analysis of the internal communication error.

With the configuration of this embodiment, upon occurrence of an internal communication error (an error for which the main control section 1 cannot acquire an error log from the engine control section 2), the engine control section 2 saves a communication error log (second information acquired by the engine control section 2) into the second nonvolatile memory 22. Therefore, regardless of the type of the error occurring to the image forming apparatus 1000 (even when the error occurring to the image forming apparatus 1000 is an internal communication error), an error log necessary for analysis of the error occurring to the image forming apparatus 1000 can securely be saved.

Further, with the configuration of this embodiment, a space area developed by erasing the second software 200 from the second nonvolatile memory 22 can be assigned as a saving area for the communication error log. Therefore, even when the second nonvolatile memory 22 is of small capacity, it becomes implementable to save the communication error log in the second nonvolatile memory 22.

Also in this embodiment, as described above, upon a restart after occurrence of an error in the image forming apparatus 1000, the main control section 1 decides whether or not the second software 200 has been stored in the second nonvolatile memory 22. When the second software 200 has not been stored in the second nonvolatile memory 22, the main control section 1 acquires a communication error log from the second nonvolatile memory 22, and saves the communication error log into the log saving area of the first nonvolatile memory 12. In the case of this configuration, after occurrence of an internal communication error in the image forming apparatus 1000, only restarting the image forming apparatus 1000 leads to a state in which an entire communication error log necessary for analysis of the internal communication error is saved in the log saving area of the first nonvolatile memory 12. Thus, the analyzer is allowed to acquire the communication error log with simplicity.

Also in this embodiment, as described above, after saving the communication error log in the log saving area of the first nonvolatile memory 12, the main control section 1 writes, into the second nonvolatile memory 22, the second software 200 stored in the first nonvolatile memory 12. In the case of this configuration, after occurrence of an internal communication error in the image forming apparatus 1000, only restarting the image forming apparatus 1000 allows the state of the second nonvolatile memory 22 to be recovered to its original state (a state with the second software 200 stored).

In this connection, when the second software 200 has been erased from the second nonvolatile memory 22, a process of writing the second software 200 onto the second nonvolatile memory 22 is executed at the restart of the image forming apparatus 1000. Therefore, the time needed to restart the image forming apparatus 1000 (restarting time) is elongated. However, some users may desire to suppress the elongation of the restarting time of the image forming apparatus 1000.

For this reason, as described above, this embodiment is so arranged as to allow the user to implement the log save setting at the user's discretion. Thus, the user's convenience is improved.

The embodiment disclosed herein should be construed as not being limitative but being an exemplification at all points. The scope of the disclosure is defined not by the above description of the embodiment but by the appended claims, including all changes and modifications equivalent in sense and range to the claims.

What is claimed is:

1. An image forming apparatus comprising:
a first control section includes first non volatile memory which is for storing first software therein and which has a lop saving area for saving an error log necessary for analysis of an occurrent error, where the first control section performs processes based on the first software and, upon occurrence of the error, acquires the error log and saves the error log into the log saving area; and
a second control section including second nonvolatile memory for storing second software therein, where the second control section performs processes based on the second software and, upon occurrence of, as the error, an internal communication error causing an interruption of communications with the first control section, erases the second software from the second nonvolatile memory and saves into the second nonvolatile memory, as the error log, a communication error log necessary for analysis of the internal communication error wherein
upon a restart after occurrence of the error, the first control section decides whether or not the second software has been stored in the second nonvolatile memory, where when the second software has not been stored in the second nonvolatile memory, the first control section acquires the communication error log from the second nonvolatile memory and saves the communication error log into the log saving area.

2. The image forming apparatus according to claim 1, wherein
the first nonvolatile memory stores therein the second software for backup use, and
after saving the communication error log into the log saving area, the first control section writes the second software stored in the first nonvolatile memory onto the second nonvolatile memory.

3. An image forming apparatus comprising;
a first control section including first nonvolatile memory which is for storing first software therein and which has a log saving area for saving an error log necessary for analysis of an occurrent error, where the first control section preforms processes based on the first software and, upon occurrence of the error, acquires the error log and saves the error log into the log saving area; and
a second control section including second nonvolatile memory for storing second software therein, where the second control section performs processes based on the second software and, upon occurrence of, as the error, an internal communication error causing an interruption of communications with the first control section, erases the second software from the second nonvolatile memory and saves into the second nonvolatile memory, as the error log, a communication error log necessary for analysis of the internal communication error
wherein
the second nonvolatile memory stores therein control information indicative of a setting content as to whether or not to save the communication error log in the second nonvolatile memory, and
upon occurrence of the internal communication error, the second control section checks the control information, where given a setting for saving the communication error log in the second nonvolatile memory, the second control section erases the second software from the second nonvolatile memory and saves the communication error log into the second nonvolatile memory and, on the other hand, given no setting for saving the communication error log in the second nonvolatile memory, the second control section neither erases the second software from the second nonvolatile memory nor saves the communication error log into the second nonvolatile memory.

* * * * *